United States Patent Office 3,450,427
Patented June 17, 1969

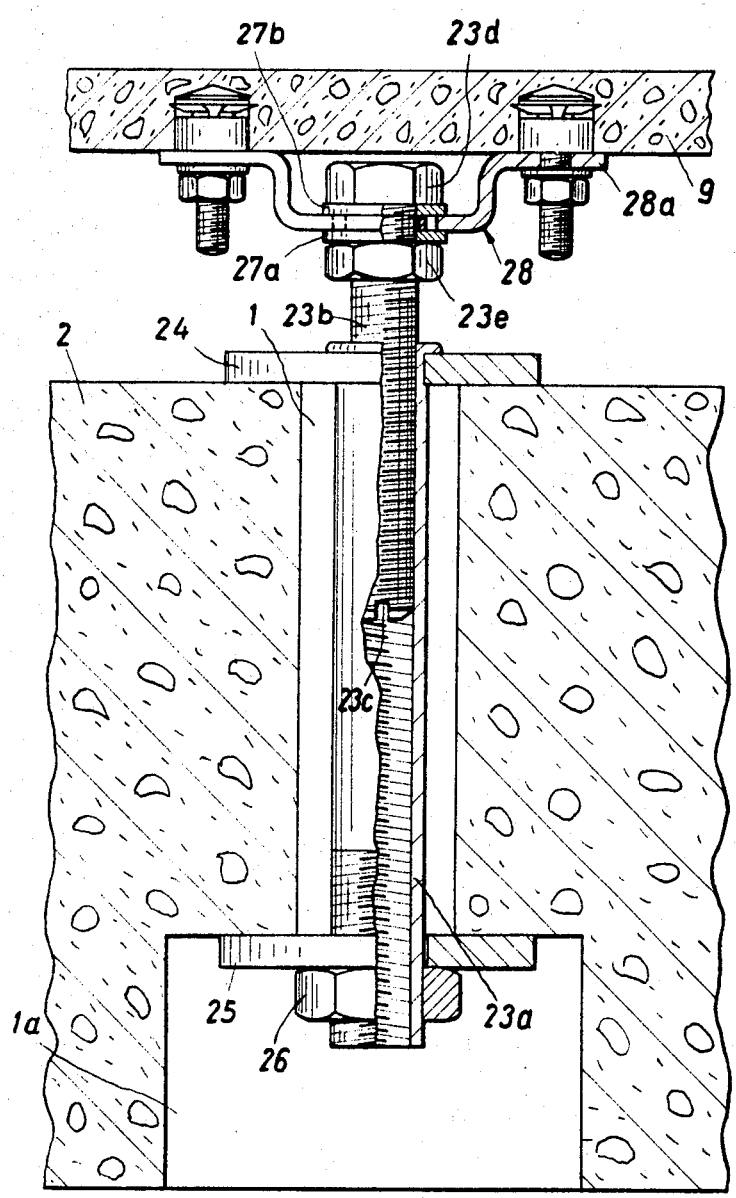

3,450,427
MOUNTING ARRANGEMENT
Artur Fischer, 133 Grunmettstetterstrasse, 7241
Tumlingen, Kreis Freudenstadt, Germany
Filed Aug. 8, 1967, Ser. No. 659,238
Claims priority, application Germany, Aug. 9, 1966,
F 49,908
Int. Cl. F16b 1/00, 5/00, 7/00, 15/02, 1/38
U.S. Cl. 287—189.36                  14 Claims

ABSTRACT OF THE DISCLOSURE

A mounting arrangement for mounting cladding members on exposed sides of masonry supporting structures. The arrangement includes a supporting structure having an inner side and an outer side and provided with an open-ended passage extending from one to the other side. An elongated element extends with clearance through the passage and is secured to the supporting structure by two members carried by the element and engaging opposite sides of the supporting structure. These members are adjustable so as to permit axial and radial movement of the elongated element in the passage. The elongated element comprises an end portion projecting outwardly beyond one of the sides of the supporting structure, and coupling means is carried by this end portion with freedom of rotation about the longitudinal axis of the element. A cladding member can be coupled to this coupling means.

Background of the invention

The present invention relates to mounting arrangements in general, and more particularly to mounting arrangements for mounting of cladding members on the exposed sides of masonry supporting structures and the like.

In modern architecture it is becoming more and more common to cover exposed sides of masonry and similar supporting structures with plate-shaped or sheet-shaped cladding members which are secured to the respective exposed side. If the masonry structure is erected in the normal manner the cladding elements are secured to the exposed side by embedding anchoring bolts in the masonry structure as it is being erected, and by mounting the cladding elements on these bolts. In constructions where the masonry structure consists of prefabricated sections which are separate with one another, it is very customary to supply the cladding members already mounted on the individual prefabricated sections. It is evident that both types of construction suffer from various drawbacks. If the cladding members are to be secured to bolts embedded in the supporting structure during erection of the same, then it is necessary to construct scaffolding which is an expensive and time-consuming procedure. It is further difficult if not entirely impossible to adjust the positioning of the cladding members with respect to one another once the bolts are fixedly anchored in the supporting structure. Where prefabricated sections are used for erecting the supporting structure it is also next to impossible to effect proper adjustment of the cladding members with respect to one another because the required tolerances of these prefabricated sections make such adjustment difficult if not impossible. Any adjustment which can, however, be actually effected does also require the erection of scaffolding.

Summary of the invention

The present invention overcomes these disadvantages. More particularly, the present invention provides a mounting arrangement which permits simple and quick adjustment of the positions of the cladding members with reference to one another.

The present invention also provides a mounting arrangement wherein the necessary adjustment of the positioning of the cladding members with reference to one another can be effected from the inner side of the supporting structure, thus eliminating the need for the erection of scaffolding.

With the mounting arrangement according to the present invention the cladding members can be adjusted not only in direction substantially parallel to the exposed side of the supporting structure on which they are mounted, but also in a direction normal thereto.

In accordance with one feature of my invention I provide a mounting arrangement which, while not so limited is particularly suitable for the mounting of cladding members on exposed sides of masonry supporting structures and analogous structures. My arrangement comprises a supporting structure which has an inner side and an outer side and which is provided with an open-ended passage extending from one to the other of these sides. Mounting means constitutes a part of my mounting arrangement and includes an elongated element which extends with clearance through the passage and is secured to the supporting structure with freedom of axial and radial adjustment in this passage. This element has an end portion which projects outwardly beyond one of the sides of the supporting structure. My mounting means further includes coupling means which is carried by the end portion with freedom of rotation about the longitudinal axis of the element and which is adapted to be coupled to a cladding member to be mounted on the supporting structure.

The novel features which are considered as characteristic for the invention as set forth in particular in the appended claims. The invention itself, however, both as to its construction and its method of operation, together with additional objects and advantages thereof, will be best understood from the following description of specific embodiments when read in connection with the accompanying drawings.

Brief description of the drawing

FIG. 5 is a view similar to FIG. 1 but illustrating yet a further embodiment of my invention.

Description of the preferred embodiments

Figure 1:
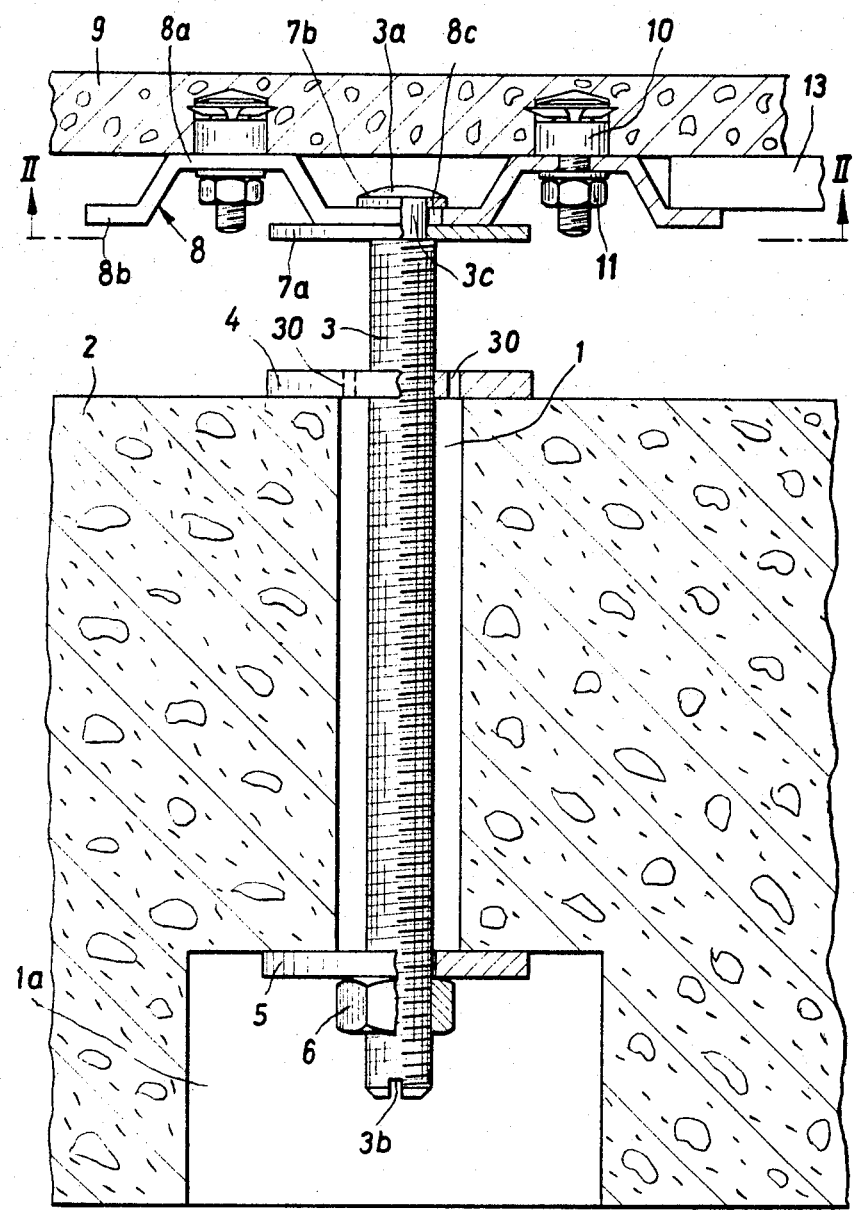
FIG. 1 is a sectional view illustrating my novel mounting arrangement in one possible embodiment thereof.
Figure 2:
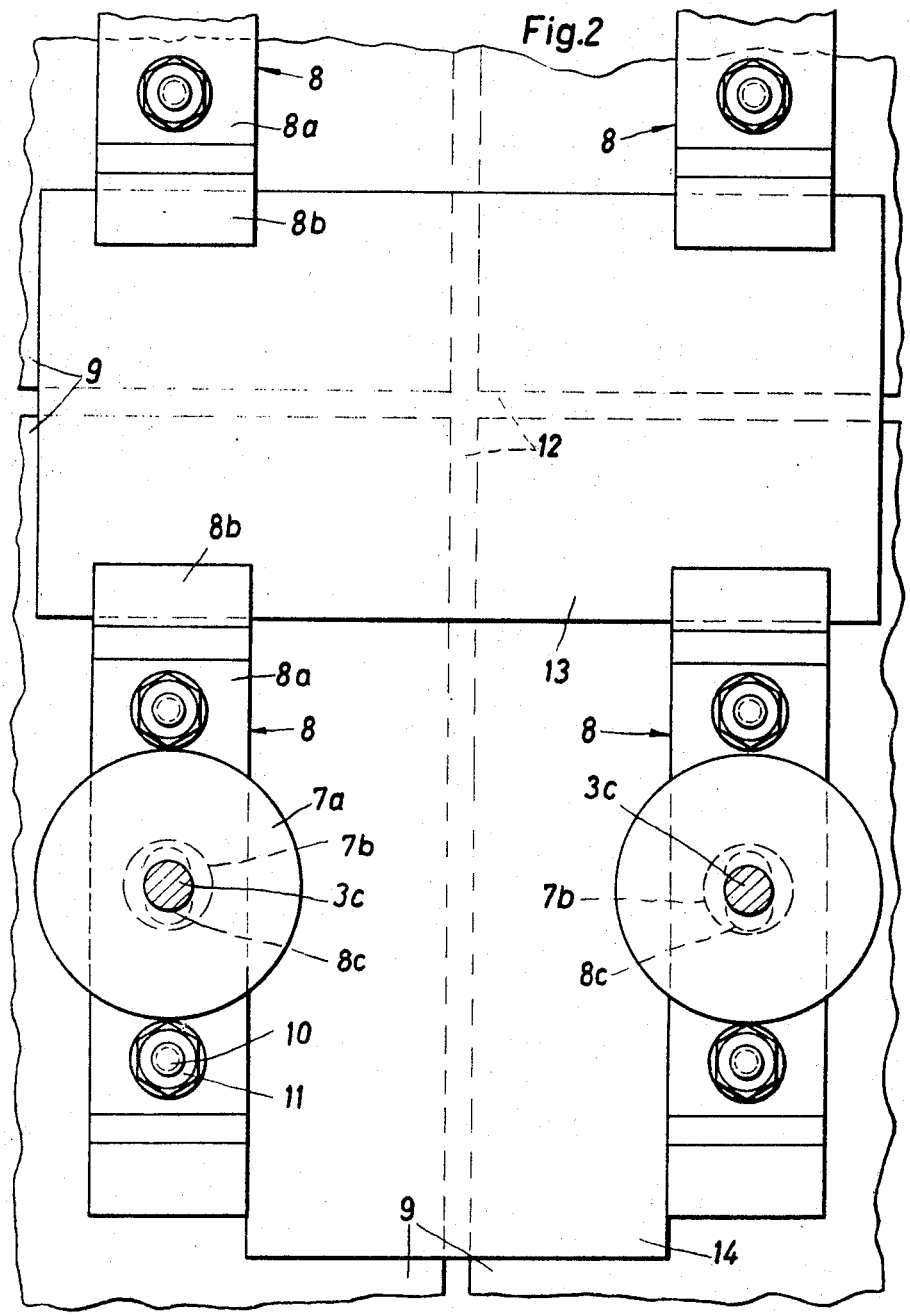
FIG. 2 is a section taken on the line II—II in FIG. 1.

Discussing now the drawing in detail, and firstly FIGS. 1 and 2 thereof, it will be seen that a supporting structure, such as a masonry wall or the like, is identified with reference numeral 2. A cladding element in form of a plate-like or sheet-like member 9 is spaced from an exposed surface of the supporting structure 2. Such cladding elements must be secured to the supporting structure at a plurality of points, usually in four different places. At each of these places a mounting arrangement according to my novel invention will be utilized, and only one such arrangement is shown in FIGS. 1 and 2 because the various arrangements can evidently all be identical. Thus, showing of all the connections associated with each of the cladding members 9 would contribute nothing to a better understanding of the invention.

FIG. 1 shows the supporting structure 2 provided with a passage 1 which extends from one to the other side of the supporting structure 2, namely from the outer to the inner side. The passage 1 has a predetermined cross sectional area and is provided adjacent the inner side of the supporting structure 2 with a section 1a whose cross sectional area is larger than the predetermined cross sectional area of the remainder of the passage 1. It will be evident that the supporting structure 2 can be a masonry wall erected in the customary manner or it can be a wall consisting of prefabricated sections.

In the embodiment of FIG. 1 an externally screw-threaded bolt 3 extends through the passage 1 and it is evident from the drawing that the diameter of the bolt is considerably smaller than the cross section of the passage 1, so that the bolt is received with substantial clearance in the passage 1. An end portion of the bolt 3 extends outwardly beyond the outer side of the supporting structure 2 and comprises a smooth non-threaded section 3c which carries a bolt-head 3a. The opposite end portion of bolt 3 projects to the section 1a of passage 1 and is provided with a slot 3b into which a manipulative tool, such as a screwdriver, can be extended.

A first nut means in form of an annular nut 4 is threaded onto the bolt 3 and overlies the outer side of the supporting structure 2. Arranged within the section 1a of the passage 1 is a second nut means including an annular member 5 which surrounds the inner end portion of the bolt 3 and which overlies a shoulder connecting the section 1a with the remainder of the passage 1, and an internally screwthreaded nut 6 which is threaded onto the inner end portion of the bolt 3 and which presses the member 5 against this shoulder. Evidently, by tightening the nut 6 the member 5 will be pressed against the aforementioned shoulder whereas the nut 4 will simultaneously be pressed against the outer side of the supporting structure 2. Thus, the bolt 3 can be secured to the supporting structure 2 and can be adjustably fixed in the passage 1 while yet being enabled to perform radial as well as axial movements in the passage 1, the latter simply being effected by threading the bolt 3 through the nuts 4 and 6 to a greater or a lesser degree, or by loosening one of the nuts 4 or 6 so as to permit radial shifting of the bolt 3 in the passage 1.

The smooth portion 3c of the bolt 3 is of lesser cross sectional diameter than the remainder of the bolt, as is evident from FIG. 1, and carries two ring members 7a and 7b. Disposed intermediate these ring members, which of course cannot move axially because both the cross section of the remainder of the bolt 3 and the cross section of the head 3a are larger than their center apertures, a holding member 8 is mounted on the portion 3c of bolt 3. Thus, the holding member 8 cannot move axially of the bolt 3, but can turn about the longitudinal axes of the bolt.

FIG. 1 clearly shows that the holding member 8 is provided with two arms which are bent in such a manner as to provide two abutment portions 8a and two retaining portions 8b which are rearwardly set from the abutment portions 8a. The holding member 8 is provided, as FIG. 2 clearly shows, with an elongated opening 8c through which the portion 3c of the bolt 3 extends. Thus, the holding member 8 can be also shifted transversely of the longitudinal extension of the bolt 3.

FIG. 1 shows how one cladding member 9 is coupled to the holding element 8 by means of bolts 10 which are anchored in the cladding member and which extend through suitable apertures in the abutment portions 8a to which they are secured by the nuts 11 which are threaded onto the bolts 10.

FIG. 1 also shows that the annular nut 4 is provided in the illustrated embodiment with two bores 30 which are so located with reference to one another that they are accessible from the section 1a of the passage 1. Thus, the nut 4 can be adjusted, for instance rotated, by extending a suitable tool through the passage 1 from the direction of the section 1a and having it engage in the bores 30.

Evidently, it would also be possible to substitute inwardly-extending projections for the bores 30.

It will be clear from a consideration of FIGS. 1 and 2 that with my novel mounting arrangement the cladding members thus secured to the supporting structure can be adjusted in all directions relative to the outer side of the supporting structure 2 by simply shifting the bolt 3 axially and/or radially in the passage 1. It will also be evident that this can be accomplished from the inside of the supporting structure 2, that is from the direction of the section 1a of the bore 1, thus eliminating the need for the erection of scaffolding on the outer side of the supporting structure 2. It is clear that the cross sectional area of the passage 1 can be selected as desired and by properly dimensioning the cross sectional area it is possible to compensate for all variations in the position of the cladding members 9 which occur in actual practice.

FIG. 2 shows that joints 12 will exist between adjacent ones of the cladding elements 9, this being an obvious occurrence. By providing the portions 8b on the holding member 8 I make it possible to cover these joints on the inner or blind sides of the cladding members 9 in a simple and effective manner by inserting closure or cover strips 13, 14 behind the cladding members 9, namely between the cladding members and the portions 8b of the holding member 8. These strips are thus held securely and close the joints 12.

Figure 3:
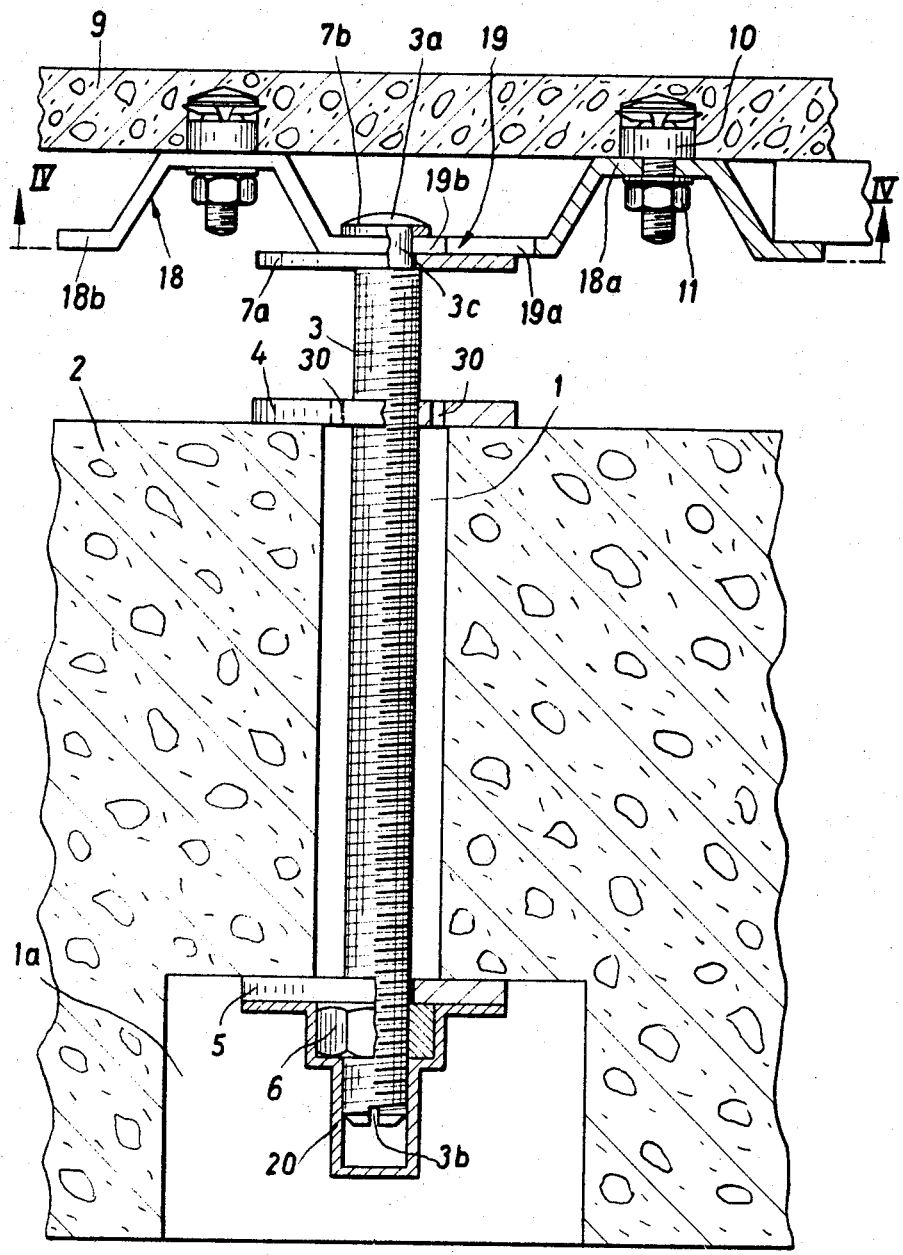
FIG. 3 is a view similar to FIG. 1 but illustrating a second embodiment of my invention.
Figure 4:
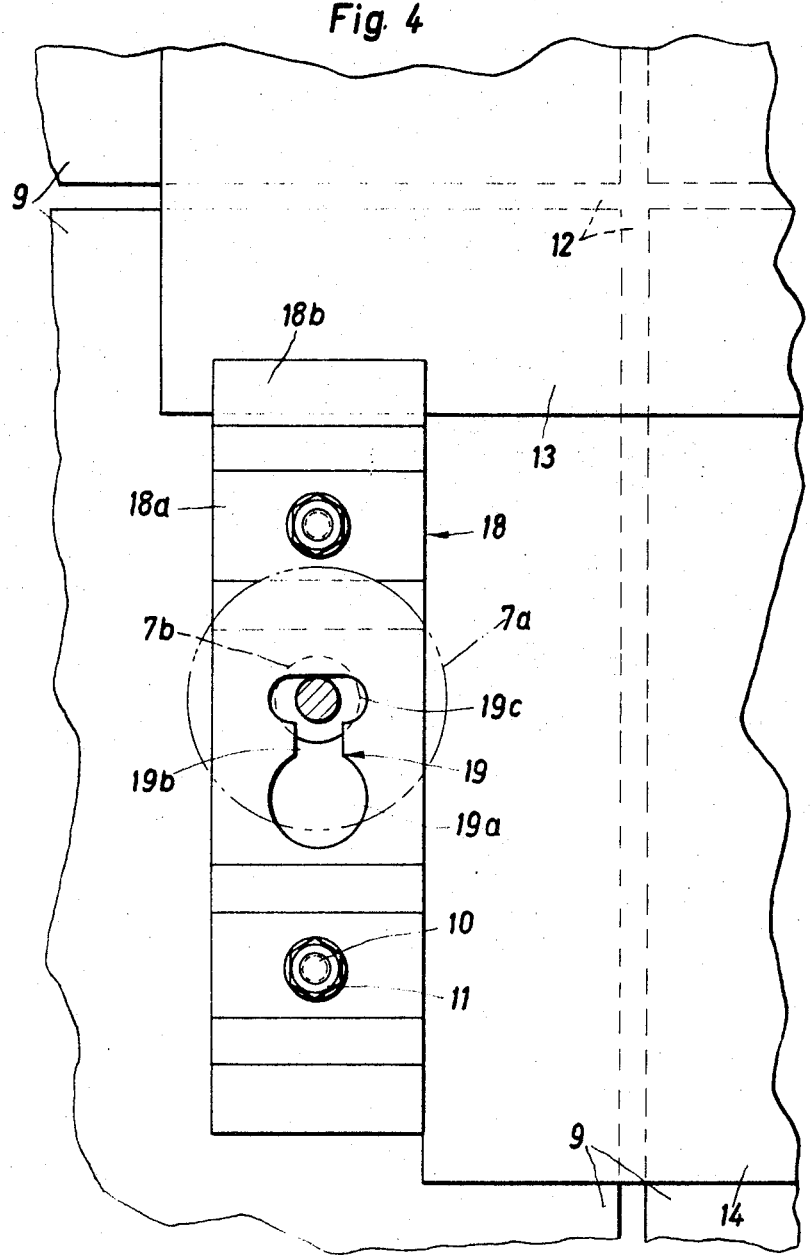
FIG. 4 is a section taken on the line IV—IV in FIG. 3.

Coming now to the embodiment illustrated in FIGS. 3 and 4 it will be seen that this is substantially the same as that shown in FIGS. 1 and 2. It differs from the first embodiment primarily in two respects. One of these is the fact that in the embodiments of FIGS. 3 and 4 the holding members 18, which corresponds to the holding member 8 of FIGS. 1 and 2, can be placed onto and removed from the bolt 3 at will. This permits application and removal of the cladding elements 9 without necessitating disassembly of the bolt if the latter has already been secured to the supporting structure 2. For this purpose the holding member 18 is provided with a key hole-shaped opening 19 which comprises a section 19a whose cross sectional area is somewhat larger than that of the head 3a, so that the head 3a can pass through the section 19a. A second section 19b of this opening 19 has a cross section smaller than that of the section 19a but large enough to accommodate the portion 3c of the bolt 3. The second section is further provided with a portion 19c which extends transversely of the remainder of the opening 19, being elongated in this transverse direction (compare FIG. 4), and this portion 19c forms with the section 19b a substantially T-shaped slot which makes it possible to compensate for thermal expansion of the cladding members 9.

An additional difference of the embodiment of FIGS. 3 and 4 over that shown in FIGS. 1 and 2 resides in the provision of an insulating cap member 20 which preferably consists of synthetic plastic material. It will be evident that the bolt 3 constitutes a thermal bridge through which cold, in particular, can penetrate through the supporting structure 2 although the section 1a of the passage 1 will normally be filled in when installation of the cladding members and their adjustment is complete, the provision of the cap member 20 constitutes an additional "interruption" of this thermal bridge and provides a desirable additional thermal safeguard.

Coming, finally, to the embodiment illustrated in FIG. 5, it will be seen that this departs from the preceding embodiments in that the bolt 3 is eliminated. In the embodiment of FIG. 5 the bolt 3 is replaced by an internally screw-threaded sleeve 23a which extends through the passage 1. The sleeve 23a is mounted on the supporting structure with freedom of radial movement only by means of a first annular member 24 which is carried by the sleeve 23a and extends into a circumferential groove provided thereon, and which abuts against the outer side of the supporting structure 2. Sleeve 23a is further fixed to this supporting structure by a second annular member 25 which loosely surrounds the sleeve 23 and abuts against the shoulder formed by the section 1a of passage 1, and which is pressed against this shoulder by a nut 26 which is threaded onto the externally threaded inner end portion of the sleeve 23a.

Threaded into the interiorly screwthreaded sleeve 23a is a bolt or screw 23b whose inner end is provided with a slot 23c corresponding to the slot 23b shown in FIG. 1 and provided for the same purpose as the slot 3b, and whose outer end projecting beyond the outer side of the supporting structure 2 is provided with a head 23d.

Inwardly of the head 23d the bolt 23b has threaded thereonto an additional nut 23e and between the nut 23e and the head 23d the bolt 23b is surrounded by two annular members 27a and 27b between which there is sandwiched a holding member 28 corresponding to the holding member 8 of FIG. 1. The holding member 28 is provided, as clearly evident from FIG. 5, with abutment portions 28a to which the cladding member 9 is secured in the same manner in which this is shown in FIG. 1.

It is clear that adjustment of the cladding member 9 in the direction normal to the outer side of the supporting structure 2 can be effected by extending a suitable tool, such as a screwdriver, from the section 1a through the sleeve 23a and into engagement with the slot 23c of the bolt 23b, so that the latter is rotated in a sense tending to extend it to a greater or lesser degree outwardly beyond the outer side of the supporting structure 2. Adjustment in direction radially of the pasage 1, on the other hand, is effected by loosening the nut 26 and shifting the sleeve together with the bolt 23b radially to the extent desired. Of course, in this embodiment as in all others, the section 1a of the passage 1 will be filled with suitable material once the final adjustments have been made to eliminate the thermal bridge constituted by bolt 23b and the sleeve 23a. Advantageously, a cap member corresponding to the member 20 shown in FIG. 3 will also be provided.

It will be understood that each of the elements described above, or two or more together, may also find a useful application in other types of arrangements differing from the types described above.

While the invention has been illustrated and described as embodied in the mounting arrangement, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A mounting arrangement, particularly for mounting cladding members on exposed sides of masonry supporting structures and the like, comprising, in combination, a supporting structure having an inner side and an outer side and being provided with an open-ended passage extending from one to the other of said sides; mounting means, including an elongated element extending with substantial radial clearance throughout said passage, said element having an end portion projecting outwardly beyond one of said sides and said mounting means further including coupling means carried by said end portion, said coupling means being secured to said end portion in a freely rotatable relationship therewith without axial movement of either of said elements relative to the other of said elements during said rotation, whereby said coupling means is provided with freedom of rotation about the longitudinal axis of said element and adapted to be rigidly coupled to a cladding member which is to be mounted on said supporting structure; and axially adjustable connecting means connecting said element with said supporting structure and being accessible and operable from said inner side of the latter for variably adjusting the axial and radial position of said element in said passage at the will of a user and rigidly maintaining said element in adjusted position thereof.

2. An arrangement as defined in claim 1, wherein said passage has a predetermined cross-sectional area, and wherein said elongated element is an externally threaded bolt, said connecting means further including a pair of internally screw-threaded nut means threaded onto said bolt and each adapted to press against one side of said supporting structure to thereby maintain said bolt in a selected position of axial and radial adjustment with reference to said passage.

3. An arrangement as defined in claim 2, wherein said one side is said outer side of said supporting structure, one of said nut means being configurated as an annulus adapted to overlie and directly engage portions of said outer side adjacent to said passage.

4. An arrangement as defined in claim 3, wherein said passage comprises inwardly adjacent said inner side of said supporting structure a section having a cross-sectional area larger than that of the remainder of said passage so that said passage is provided with an internal radial shoulder, said bolt having an other end portion located in said section and the other of said nut means comprising an annular member surrounding said other end portion and overlying said shoulder and a nut member threaded onto said other end portion and pressing said annulus into abutment with said shoulder.

5. An arrangement as defined in claim 1, wherein said elongated element comprises an internally screw-threaded sleeve extending with clearance through said passage and connected to said supporting structure with freedom of radial adjustment, and an externally screw threaded bolt threadedly received in said sleeve, said bolt being provided with said end portion and the latter projecting beyond said sleeve and said one side, and said bolt being accessible through said sleeve from the other side of said supporting structure for axial adjustment with reference to said sleeve and said passage.

6. An arrangement as defined in claim 4, and further comprising a cap member of thermally insulating material received in said section of said passage and surrounding said other end portion of said bolt and said other nut means thereon.

7. An arrangement as defined in claim 6, wherein said cap member consists of synthetic plastic material.

8. An arrangement as defined in claim 1, wherein said coupling means comprises a double-armed holding member rotatably mounted on said end portion.

9. An arrangement as defined in claim 8, wherein said holding member is provided with an elongated opening through which said end portion extends so that said holding member is slidable on said end portion in direction transversely of said axis.

10. An arrangement as defined in claim 8, wherein said end portion comprises a head having a predetermined diameter greater than that of the remainder of said end portion, said holding member being provided with a keyhole shaped opening including one portion having a diameter slightly larger than said predetermined diameter of said head, and an elongated second portion having a diameter smaller than said predetermined diameter but larger than the diameter of the remainder of said end portion, whereby said holding member can be placed onto and removed from said end portion without necessitating removal of said elongated element from said passage.

11. An arrangement as defined in claim 10, wherein said second portion of said opening has opposite ends and said first portion communicates with one of said ends; said second portion comprising a section extending transversely of said second portion at the other end of the same.

12. An arrangement as defined in claim 9, wherein said holding member comprises a center portion provided with said opening, and two arm portions provided on said center portion and extending to opposite sides thereof transversely of said axis as well as being spaced from said center portion in the direction outwardly away from said one side of said supporting structure.

13. An arrangement as defined in claim 12, and further comprising cover strips for covering joints existing between adjacent spaced-apart cladding members and engaged by the respective arm portions of said holding member in positions overlying such joints and abutting against the respective spaced-apart cladding members.

14. An arrangement as defined in claim 3, wherein said annulus constituting said one nut means has a surface facing said passage, said annulus being provided with engaging portions arranged so as to be accessible from said surface and through said passage from the other side of said supporting structure so as to enable adjustment of said annulus from said other side.

References Cited

UNITED STATES PATENTS

| | | | |
|---|---|---|---|
| 2,066,006 | 12/1936 | Kellogg | 52—704 |
| 2,618,145 | 11/1952 | Sinner et al. | 52—704 |
| 2,633,735 | 4/1953 | Dondero | 52—378 |
| 2,726,009 | 12/1955 | Murdock et al. | 85—35 |
| 2,734,126 | 2/1956 | Kruger | 52—484 |
| 2,795,130 | 6/1957 | Pritchett | 52—365 |
| 3,087,206 | 4/1963 | Delf et al. | 52—378 |

FOREIGN PATENTS 771,598   4/1957   Great Britain.

CARL W. TOMLIN, *Primary Examiner.*

R. S. BRITTS, *Assistant Examiner.*

U.S. Cl. X.R.

85—53; 52—378, 704